Oct. 22, 1929.   W. J. SPIRO   1,732,993
ADJUSTABLE BOLT MOUNTING
Filed Aug. 24, 1927
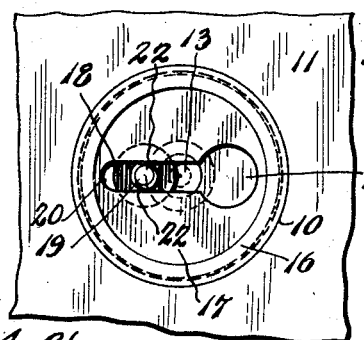
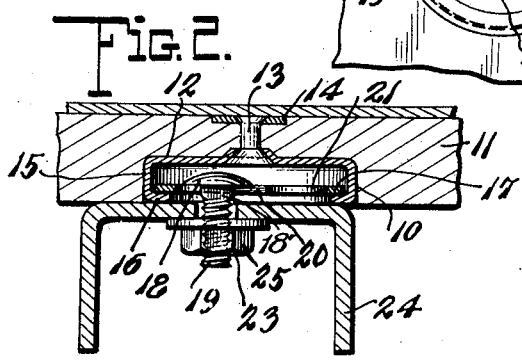
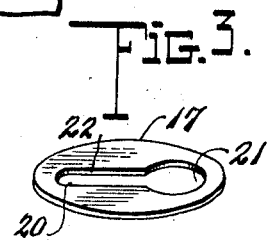
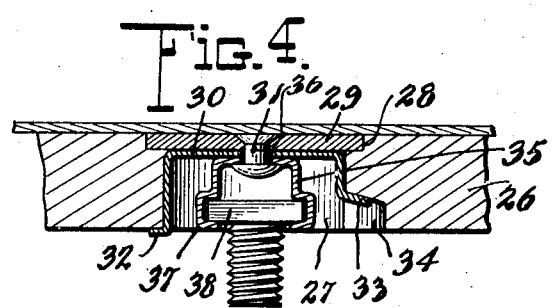
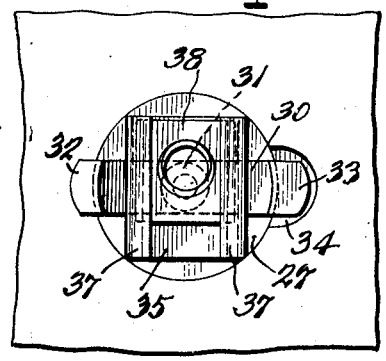
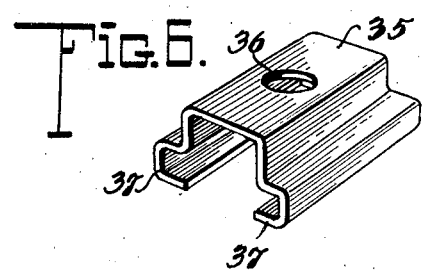
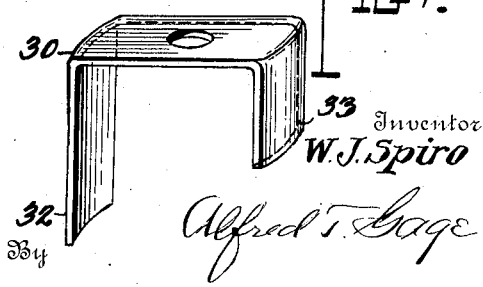
Inventor
W. J. Spiro
By Alfred T. Gage
Attorney Patented Oct. 22, 1929

1,732,993

UNITED STATES PATENT OFFICE

WALTER J. SPIRO, OF WHITE PLAINS, NEW YORK

ADJUSTABLE BOLT MOUNTING

Application filed August 24, 1927. Serial No. 215,061.

This invention relates to an adjustable bolt mounting and particularly to retaining means for a bolt head shiftable in a plurality of planes transverse to the bolt axis so that it may be disposed in different positions at the various intersections of such planes.

In my copending application No. 215,060 filed of even date herewith I have generically claimed the invention in connection with one application thereof wherein the lines of movement for the adjustment of the bolt are rectilinear, while in the present embodiment of the invention the paths of travel are rectilinear and arcuate, the former line of movement being preferably radial to the axis of the rotatable member. This provides for a wide field of bolt adjustment at the intersections of said paths and especially adapts the invention for mounting securing bolts upon the under face of automobile running boards so that they may be shifted to properly aline with the supporting hanger. In the assemblage of replacement boards after the damage or destruction of the original running board it is frequently found that the position of the hanger has been distorted and it therefore becomes necessary to shift the position of the securing bolt. By using the straight and curved paths of travel a very fine adjustment can be secured so as to accurately position the bolt at the aperture in the object to be secured thereby.

It is also desirable to provide for the insertion of the bolt head into the carrier after the latter has been mounted upon the board so as to permit the board to be shipped or stored in flat abutting position. I have therefore provided means in this invention by which the bolt head may be axially inserted and laterally moved into sliding non-rotatable engagement with the carrier.

The invention has for an object to provide a novel and improved mounting in which the bolt carrier is capable of a rotary movement and the bolt adjustable thereon in a path intersecting such plane of rotation.

A further object of the invention is to present a new bolt mounting comprising a pivoted member formed with means for the adjustment of a bolt radially from the axis of such member.

Another object of the invention is to provide a novel structure of rotatably mounted bolt carrier provided with a way in which the bolt is retained against rotation and rendered slidingly adjustable radially to the axis of the carrier.

A still further object of the invention is to present an adjustable mounting for the bolt head formed with means to permit the introduction of the bolt head after the mounting has been attached to a supporting body.

Other and further objects and advantages of the invention will be hereinafter set forth and the novel features thereof defined by the appended claims.

In the drawing—
Figure 1 is a bottom plan;
Figure 2 is a vertical section of a running board and hanger assembled;
Figure 3 is a detail perspective of the bolt carrier;
Figure 4 is a vertical section of a modified form of the invention;
Figure 5 is a bottom plan thereof;
Figure 6 is a detail perspective of the modified carrier;
Figure 7 is a similar view of the retainer before application.

Like numerals refer to like parts in the several figures of the drawing.

The invention may be applied to any desired body for adjustably mounting a bolt member thereon, and in the present embodiment of the invention is shown as disposed within a recess 10 in the underface of a running board 11. In Figures 1, 2 and 3 the retainer 12 comprises a circular body secured within said recess by a rivet or other fastening 13 extending to the upper face of the board where it engages an inset washer 14. The peripherial walls of the retainer are angularly disposed at 15 and have an inturned flange 16 which overlaps and retains the loosely mounted carrier plate 17 disposed to provide a space for the head 18 of the securing bolt 19.

This plate is formed with a key-hole slot 20 having the enlarged portion 21 to permit the passage of the bolt head 18 therethrough and the parallel walls 22 which engage the angular portion 18' of the bolt head by which it is held from turning. When the parts are assembled the bolt 19 is adjusted to aline with and extended through an aperture 23 in a hanger 24 and all the parts secured in their adjusted position by the nut 25. The term "bolt" is used herein as defining any equivalent structure by which two parts are secured in assembled relation.

The carrier plate is spaced from the base of the retainer a distance substantially equal to the bolt head 18 supported by the plate so that axial movement of the bolt is prevented to permit the application of a nut thereto and the angular portion 18' beneath the head prevented from leaving the walls 22 of the slot by which the bolt is held against rotation.

In the modified form of the invention disclosed in Figures 4 to 7 the board 26 is formed with an aperture 27 extending therethrough and formed with a shoulder 28 near the upper face of the board to receive a supporting plate 29. The retainer 30 is mounted upon this plate by means of a rivet 31 or similar device, and has its end 32 bent to engage the under face of the board and its opposite end 33 bent to engage the inner wall of a recess 34 which merges into the aperture 27 and forms means by which the head of a bolt may be introduced into a carrier 35 when turned to a position at a right angle to that shown in Figure 5.

This carrier is centrally pivoted at 36 upon the rivet 31 and forms an elongated body with its free edges bent to produce parallel angular ways 37 to receive the angular portion 38 of a bolt head and retain the same against rotation while permitting a sliding adjustment thereof, as shown in Figures 4 and 5.

In each form of the invention the bolt is capable of a rotative adjustment and also of a sliding movement transversely to the path of such rotation which permits a wide field of adjustment in the position of the bolt at the intersection of the two paths of travel. This mounting provides for the attachment of the retainer and carrier to a body and the subsequent insertion and adjustment of the bolt member which when secured to the attached object clamps the adjustable parts in position. The invention presents a simple, efficient and conveniently applied mounting for retaining a bolt against rotation and adjusting the same into proper alinement with a fixed body to which it is to be secured.

While the details of the invention have been specifically shown and described, it is not confined thereto, as changes and alterations may be made without departing from the spirit of the invention as recited in the following claims.

What I claim is:—

1. A bolt mounting comprising a retainer, a carrier freely rotatable within the retainer in a constant plane relative thereto, means upon the carrier for preventing rotative movement of a bolt head supported thereby, and means for preventive axial movement of said bolt head within the retainer.

2. A bolt mounting comprising a retainer having a base and a parallel inturned flange, and a carrier plate freely rotatable upon said flange and spaced from the retainer base a distance substantially equal to a bolt head to be supported by the carrier to prevent axial movement of the bolt, said plate being formed with an opening having parallel walls to engage an angular portion at the bolt head and an enlargement of said opening to permit the introduction of the bolt head into contact with the inner face of said plate.

In testimony whereof I affix my signature.

WALTER J. SPIRO.